(12) United States Patent
Ichihara

(10) Patent No.: US 7,766,355 B2
(45) Date of Patent: Aug. 3, 2010

(54) MOTORCYCLE REAR FENDER ASSEMBLY

(75) Inventor: Fumio Ichihara, Hyogo (JP)

(73) Assignee: Kawasaki Jukogyo Kabushiki Kaisha, Hyogo (JP)

(*) Notice: Subject to any disclaimer, the term of this patent is extended or adjusted under 35 U.S.C. 154(b) by 0 days.

(21) Appl. No.: 12/233,317

(22) Filed: Sep. 18, 2008

(65) Prior Publication Data
US 2009/0079156 A1     Mar. 26, 2009

(30) Foreign Application Priority Data
Sep. 21, 2007   (JP)  ............................. 2007-246099

(51) Int. Cl.
*B62D 25/16*  (2006.01)
(52) U.S. Cl. .................... 280/152.3; 180/219
(58) Field of Classification Search .............. 180/219; 280/160, 160.1, 152.1, 152.3; 293/105; 296/198
See application file for complete search history.

(56) References Cited

U.S. PATENT DOCUMENTS

| 6,695,330 | B2 * | 2/2004 | Hata ......................... 280/152.3 |
| 7,431,374 | B2 * | 10/2008 | Konno et al. ................ 296/78.1 |
| 2008/0054585 | A1 * | 3/2008 | Konno et al. ............. 280/152.1 |

FOREIGN PATENT DOCUMENTS

JP           60-46390          4/1985

* cited by examiner

*Primary Examiner*—Lesley Morris
*Assistant Examiner*—Jacob Knutson

(57) ABSTRACT

A motorcycle rear fender assembly includes a rear fender mounted on a vehicle frame structure above a vehicle rear wheel, which fender is divided, in a forward and rearward direction, into three components, including an anterior rear fender subassembly forming a front portion of the rear fender, an intermediate rear fender subassembly forming an intermediate portion of the rear fender, and a posterior rear fender subassembly forming a rear portion of the rear fender.

12 Claims, 5 Drawing Sheets

MOTORCYCLE REAR FENDER ASSEMBLY

CROSS-REFERENCE TO RELATED APPLICATIONS

This application is based on and claims priority to the Japanese Patent Application No. 2007-246099, filed Sep. 21, 2007, which is incorporated by reference in its entirety into this application.

BACKGROUND OF THE INVENTION

1. Field of the Invention

The present invention relates to a rear fender assembly for a motorcycle of a type designed to move on a leveled ground surface with full gear, as well as on an irregular road, for example, a mountain road or a racing circuit such as a racing course.

2. Description of the Prior Art

The rear fender assembly hitherto used in this type of motorcycle includes a front-half rear fender subassembly, arranged above a motorcycle rear wheel and below a seat assembly, and a rear-half rear fender subassembly extending rearwardly from the seat assembly. The rear fender subassembly has a mudguard flap connected therewith so as to extend slantwise downwardly and a taillight fitted thereto, and the flap has a license plate fitted thereto. See, for example, the Japanese Laid-open Utility Model Publication No. 60-46390. In this type of motorcycle, the flap is removed from the rear fender subassembly when the motorcycle is desired to be driven on the irregular road or the racing circuit.

However, it has been found that the rear-half rear fender subassembly of the conventional motorcycle, that is exposed rearwardly of the seat assembly, has a rear end portion susceptible to damage during the run in the racing circuit and, once it is damaged, the rear-half rear fender subassembly in its entirety must be repaired or replaced and this is indeed uneconomical. Also, manufacture of the rear-half rear fender subassembly, which has a substantial length, requires the use of a bulky mold assembly, which is indeed expensive. In addition, since the rear fender subassembly is structured in a one-piece component, the rear fender assembly generally lacks an appealing feature and represents a monotonous appearance.

Particularly where the motorcycle is driven on a racing circuit, the motorcycle generally suffices to be equipped with a minimum number of component parts that are required for driving, but all that can be removed is only the flap and, therefore, the weight of the motorcycle cannot be sufficiently reduced to a value required for the motorcycle to run on the racing circuit because the rear-half rear fender subassembly overlying the motorcycle rear wheel, which subassembly has a substantial weight, is left unremoved.

SUMMARY OF THE INVENTION

In view of the foregoing, the present invention is intended to provide a motorcycle rear fender assembly, in which in the event of damage to the rear portion of the rear fender assembly, repair or replacement of a small component part is sufficient, which assembly is also effective to reduce the cost of the mold assembly and has an appearance different from that of the conventional rear-half rear fender subassembly of one-piece construction to thereby enhance the commercial value.

In order to accomplish the foregoing object, the present invention provides a motorcycle rear fender assembly including a rear fender mounted on a motorcycle frame structure above a motorcycle rear wheel, which fender includes an anterior rear fender subassembly forming an anterior portion of the rear fender, an intermediate rear fender subassembly forming an intermediate portion of the rear fender, and a posterior rear fender subassembly forming a rear potion of the rear fender.

According to the present invention, the rear fender is of three-piece construction including the anterior rear fender subassembly, the intermediate rear fender subassembly and the posterior rear fender subassembly. Accordingly, in the event that the rear portion of the rear fender assembly damages during the run on the racing circuit, repair or replacement of only the posterior rear fender subassembly, which is a small component part, is sufficient and, thus, repair or replacement can be facilitated economically.

Also, division of the rear fender assembly into the three subassemblies results in compactization of each of those three subassemblies, accompanied by reduction in cost of the mold assembly. By way of example, when the conventional rear fender subassembly is divided into an intermediate rear fender and a posterior rear fender, the size of a mold assembly for making each of the intermediate rear fender and the posterior rear fender can be reduced and, therefore, the cost of the mold assembly can be reduced.

As regards the manufacture of the motorcycle rear fender assembly of the present invention, the intermediate rear fender subassembly and the posterior rear fender subassembly, which form a portion of the rear fender assembly, that is exposed to the outside, can be formed separately and, accordingly, the rear fender assembly as a whole can have an appearance different from the conventional rear fender of one-piece construction to thereby enhance the commercial value. This is particularly true when the intermediate rear fender subassembly and the posterior rear fender assembly are colored in different colors, respectively.

In a preferred embodiment of the present invention, the rear fender assembly may also include a flap continued from the rear fender and covering a region rearwardly upwardly of the motorcycle rear wheel, and at least the posterior rear fender subassembly and the flap are removably mounted on the motorcycle.

The use of full gear including the flap referred to above together with the anterior rear fender subassembly, the intermediate rear fender assembly and the posterior rear fender subassembly renders the motorcycle to be appropriate for running on a leveled ground surface. Even when the flap is removed from the rear fender assembly, a combination of the anterior rear fender subassembly, the intermediate rear fender assembly and the posterior rear fender subassembly exhibits a mudguard function substantially similar to the existing rear fender and, accordingly, the motorcycle can be rendered to be appropriate for running on an irregular ground surface. In addition, when the flap and the posterior rear fender subassembly are removed from the rear fender assembly, a combination of the anterior rear fender subassembly and the intermediate rear fender subassembly assures a minimum mudguard function required in a racing circuit and a reduction in weight of the vehicle and, hence, allows the motorcycle to be appropriate for running on a racing circuit.

In another preferred embodiment of the present invention, the posterior rear fender subassembly is preferably fastened to the motorcycle through fastening members and, at least some of which are those concurrently used to connect the flap to a motorcycle frame structure.

The use of at least some of the fastening members, which are commonly used to connect the posterior rear fender subassembly with the motorcycle and also to connect the flap to the motorcycle frame structure, is particularly advantageous in that when such some of the fastening members are removed, both of the posterior rear fender subassembly and the flap can be removed. Where only the flap is desired to be removed, such some of the fastening members are used to connect only the posterior rear fender subassembly with the frame structure after the flap has been removed by undoing such some of the fastening members. Accordingly, as compared with the case in which the posterior rear fender subassembly and the flaps are fitted by the use of different sets of fastening members, the number of the fastening members used can be reduced advantageously.

In a further preferred embodiment of the present invention, the flap may have a taillight and turn signal lights both mounted thereon. This is particularly advantageous in that considering that neither the taillight nor the turn signal lights are necessary when the motorcycle is desired to be driven on the irregular ground surface or the racing circuit, the both can be removed from the motorcycle simultaneously when the flap is removed. Where the license plate is mounted on the flap, this license plate can also be removed together with the taillight and the turn signal lights simultaneously with removal of the flap.

In still further preferred embodiment of the present invention, a rear portion of the intermediate rear fender subassembly is preferably overlapped with a front portion of the posterior rear fender subassembly. This arrangement allows the motorcycle rear fender assembly to represent a streamlined configuration as if the intermediate and posterior rear fender subassemblies are of a unitary construction having an appealing appearance.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

A preferred embodiment of the present invention will be described in detail with particular reference to the accompanying drawings.

Figure 1:
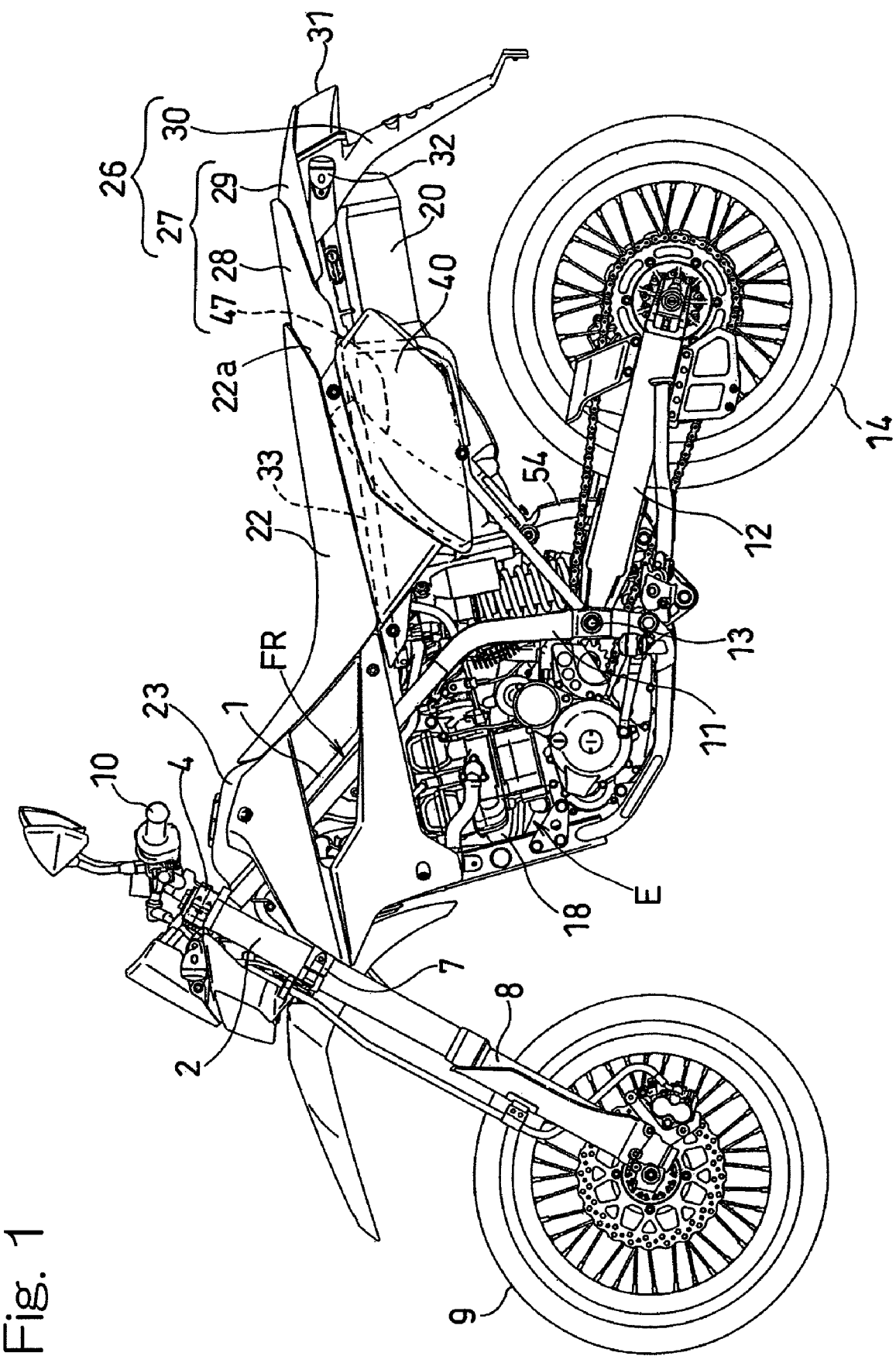
FIG. 1 is a side view showing a motorcycle provided with a rear fender assembly according to a preferred embodiment of the present invention.

FIG. 1 illustrates, in a side view, a motorcycle provided with a rear fender assembly 26 according to the preferred embodiment of the present invention. The illustrated motorcycle includes a motorcycle frame structure FR forming a skeleton of the motorcycle. The motorcycle frame structure FR has a main frame 1, forming a front part of the frame structure FR, and a rear frame 33 forming a rear part of the frame structure FR and supporting a rider's seat assembly 22.

The main frame 1 has a head tube 2 rigidly secured to a front portion thereof, and a steering shaft (not shown) is rotatably inserted in and is supported by the head tube 2. Upper and lower brackets 4 and 7 are supported by the head tube 2 through the steering shaft, and a front fork 8 has an upper portion supported by the upper and lower brackets 4 and 7 so as to extend therebetween. A front wheel 9 is rotatably carried by and between respective lower ends of the front fork 8, and a handlebar 10 is rigidly mounted on the upper bracket 4 at the upper portion of the front fork 8 for movement together therewith.

A swingarm bracket 11 is secured to a rear lower portion of the main frame 1 and a swingarm assembly 12 is connected at a front end thereof with the swingarm bracket 11 through a pivot pin 13 for movement up and down. A rear drive wheel 14 is rotatably supported by a rear end of the swingarm assembly 12. A motorcycle engine E is mounted on a lower intermediate portion of the main frame 1. An exhaust tube 18 fluidly connected with the motorcycle engine E is fluidly connected with a muffler 20 disposed on a right side and supported by a rear upper portion of the motorcycle frame structure FR.

The rear frame 33 connected or integral with a rear portion of the main frame 1 includes a rider's seat assembly 22 mounted thereon. The rear fender assembly 26 of the present invention is mounted on this rear frame 33 and positioned above the rear drive wheel 14. This rear fender assembly 26 includes a rear fender 27 and a rear mudguard flap 30 extending rearwardly from the rear fender 27 so as to substantially overhang the rear wheel 14. The rear fender 27 serves as a mudguard covering forwardly and upwardly of the rear wheel 14 and is made of, for example, a synthetic resin. The rear mudguard flap 30 also serves as a mudguard covering upwardly and rearwardly of the rear wheel 14 and is made of, for example, a rubber material or synthetic resin.

The rear fender 27 is made of a synthetic resin by the use of a molding technique in a three-piece construction including an anterior rear fender subassembly 47 forming a front portion of the rear fender 27, an intermediate rear fender subassembly 28 forming an intermediate portion of the rear fender 27, and a posterior rear fender subassembly 29 forming a rear portion of the rear fender 27. The anterior rear fender subassembly 47 corresponds to a front half of the conventional rear fender; the intermediate and posterior rear fender subassemblies 28 and 29 in combination correspond to a rear half of the conventional rear fender.

The anterior rear fender assembly 47 is positioned below the seat assembly 22 and the intermediate rear fender subassembly 28 has its front portion positioned beneath the seat assembly 22 and, hence, overhung by a rear portion of the seat assembly 22, and also has its rear portion exposed rearwardly from a rear end edge 22a of the seat assembly 22. In other words, the intermediate rear fender subassembly 28 has only a portion thereof covered by the seat assembly 22 and the remaining portion exposed rearwardly from the seat assembly 22 so that the remaining portion can be viewable from the outside. The posterior rear fender subassembly 29 has a front portion thereof positioned beneath the intermediate rear fender subassembly 28 and, hence, overhung by a rear portion of the intermediate rear fender subassembly 28 and also has a rear portion exposed to the outside so that the rear portion of the posterior rear fender subassembly 29 can be viewable from the outside. The rear mudguard flap 30 has a taillight 31 fitted to a rear surface thereof and also has rear turn signal lights 32 fitted to the respective side surfaces thereof.

A front mudguard flap 54 is arranged at a location forwardly and downwardly of the rear fender assembly 26 so as to cover forwardly of the rear wheel 14. This front mudguard flap 54 is generally made of a material such as, for example, a rubber material or a synthetic resin, which is different from that used for the rear fender 27. A fuel tank 23 is mounted on an upper portion of the main frame 1, that is, on an upper portion of the motorcycle frame structure FR between the handlebar 10 and the seat assembly 22.

Figure 2:
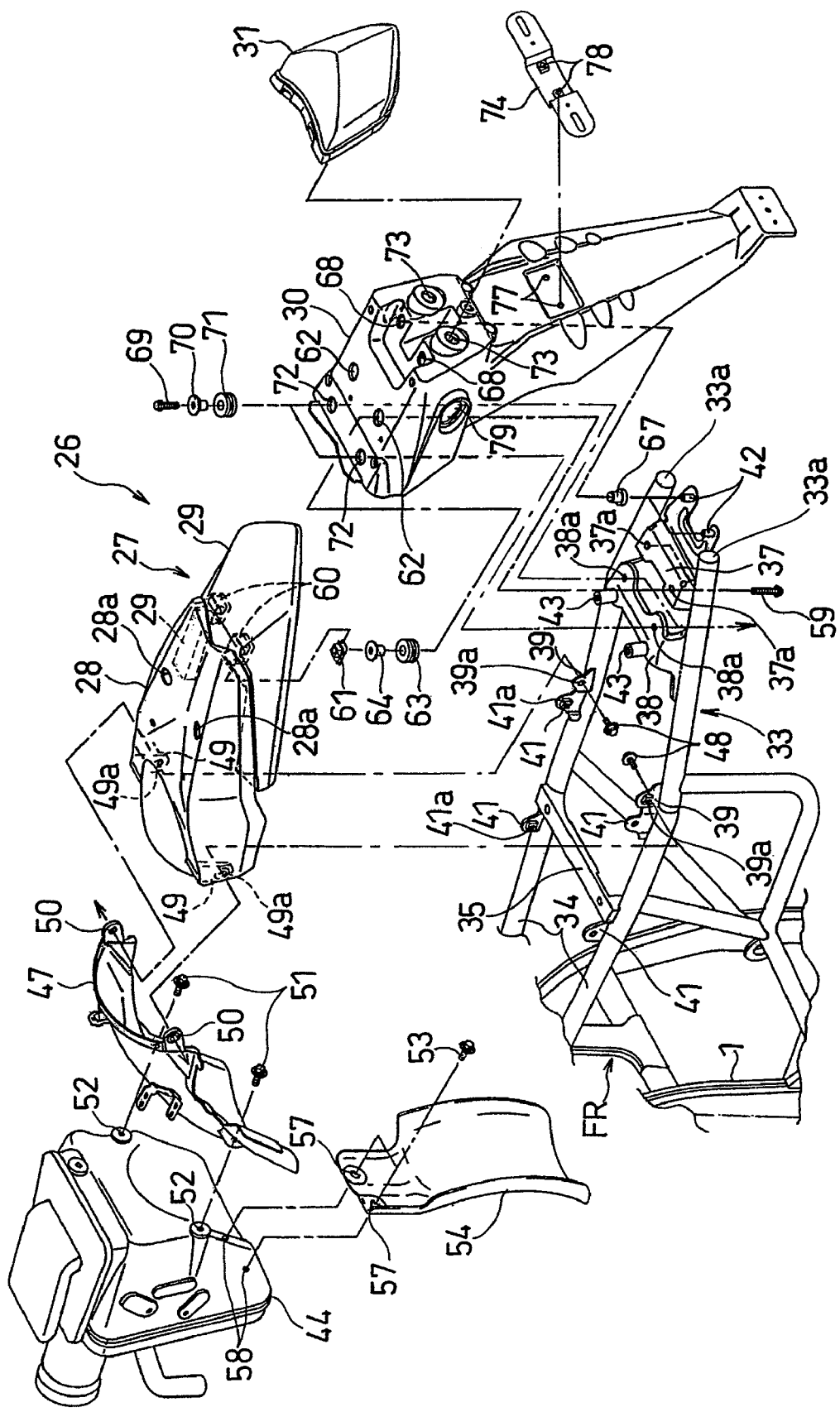
FIG. 2 is an exploded view of the rear fender assembly.
Figure 3:
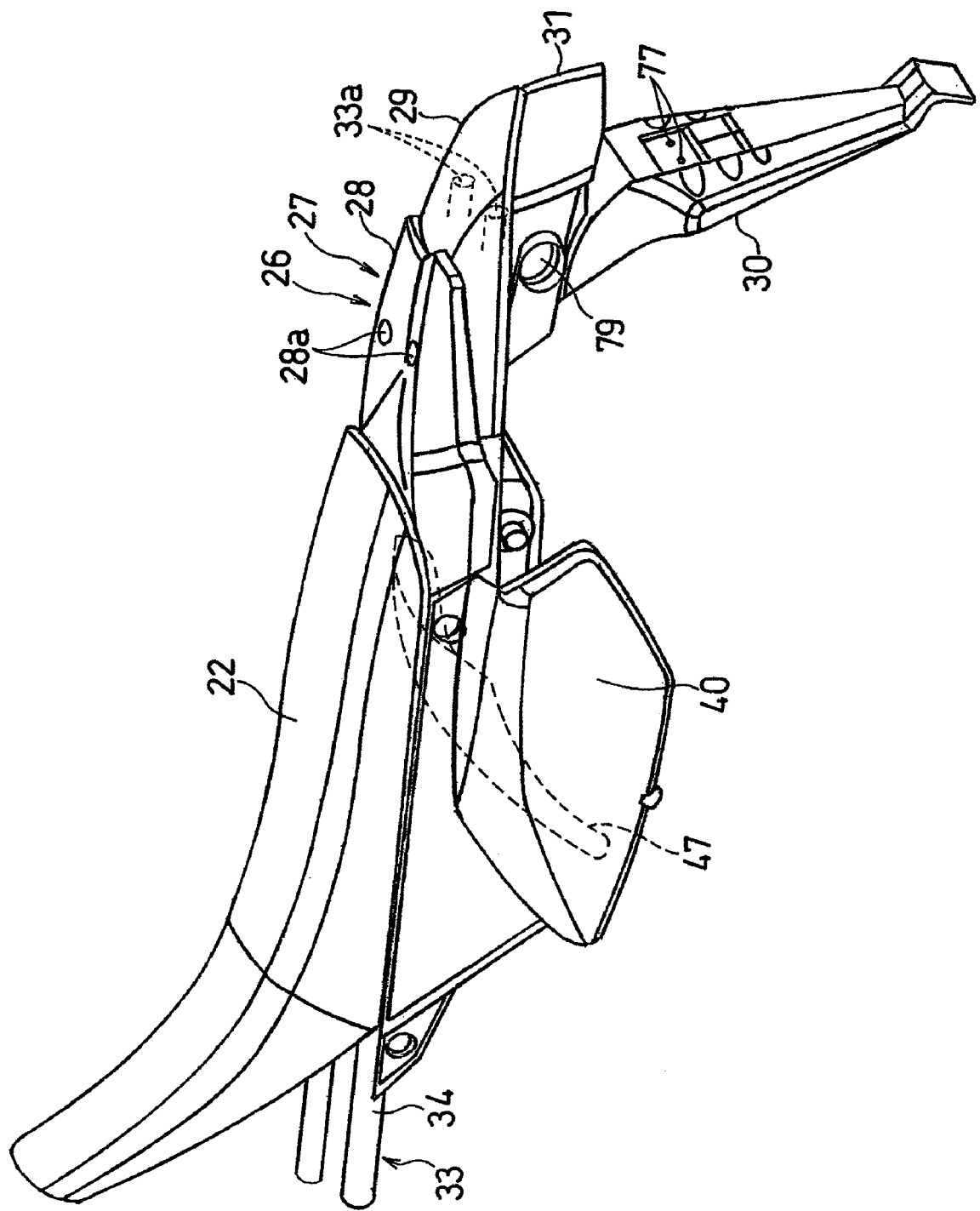
FIG. 3 is a perspective view showing the rear fender assembly in a condition assumed when the motorcycle moves on the leveled ground surface.

Referring now to FIG. 2, there is shown an exploded view of the rear fender assembly 26. The rear frame 33 connected or integral with a rear portion of the main frame 1 and forming the rear portion of the motorcycle frame structure FR includes a pair of substantially parallel rail members 34 and 34, a cross member 35 positioned generally intermediate of the length of the rail members 34 and 34 and having its opposite ends welded to the rail members 34 and 34 so as to straddle therebetween, and first and second transverse mounting plates 37 and 38 positioned proximate to respective rear ends of the rail members 34 and 34 and each having its opposite ends welded to the rail members 34 and 34 so as to straddle therebetween. The rail members 34 and 34 have respective left and right mounting brackets 39 and 39 welded thereto and positioned intermediate between the cross member 35 and the transverse mounting plates 37. The rail members 34 and 34 also have front and rear pairs of left and right support brackets 41 and 41, which pairs are spaced apart from each other in a direction conforming to the longitudinal axis of the motorcycle frame structure FR, and the left and right support brackets 41 and 41 of each of the front and rear pair being welded to the respective rail members 34 and 34.

Each pair of the first and second transverse mounting plates 37 and 38 have left and right positioning pins 42 and 43 secured thereto, respectively. A left pair of the support brackets 41 are utilized to support a left side cover 40 (FIG. 1) fitted thereto by means of set bolts (not shown) threaded into corresponding nuts 41a welded to such brackets 41, and a right pair of the support brackets 41 are similarly utilized to support a right side cover 40 (FIG. 1) fitted thereto by means of set bolts (not shown) threaded into corresponding nuts 41a welded to such brackets 41. Those left and right side covers 40 cover a major portion of the anterior rear fender subassembly 47 and a front portion of the intermediate rear fender subassembly 28 from respective sides.

A pair of positioning pins 42 described above are engageable in respective positioning holes 68 defined in the rear mudguard flap 30. Specifically, the rear mudguard flap 30 is positioned relative to the rear frame 33 by means of collars 67 inserted into the respective positioning holes 68 in the rear mudguard flap 30. In this condition, the rear mudguard flap 30 is removably connected with the rear frame 33 by passing a pair of fastening bolts 69 (only one of which is shown) through respective collars 70 and grommets 71 and then through associated insertion holes 72 defined in the rear mudguard flap 30 and finally threaded into corresponding internally threaded holes 38a defined in the second transverse mounting plate 38 in the rear frame 33.

The posterior rear fender subassembly 29 referred to above has a pair of brackets 60 secured to a rear portion thereof and each having an insertion hole defined therein. This posterior rear fender subassembly 29 has its rear portion overriding a front portion of the rear mudguard flap 30 with the insertion holes of the brackets 60 aligned with respective mounting holes 62 defined in the rear mudguard flap 30 and, in this condition, the posterior rear fender subassembly 29, together with the rear mudguard flap 30, is removably connected with the rear frame 33 by means of two fastening bolts (only one of which is shown) 59 which are common fastening members.

In other words, the left and right brackets 60 of a generally U-shaped configuration, each having the insertion hole defined therein and having a respective nut 61 plugged thereinto, are secured to an undersurface of the posterior rear fender subassembly 29. The posterior rear fender subassembly 29 and the rear mudguard flap 30 are connected with the rear frame 33 by means of the fastening bolts 59 which are, after having been passed through the respective insertion holes 37a in the first transverse mounting plate 37 and then through grommets 63 and collars 64 both inserted in the mounting hole 62 of the rear mudguard flap 30, threaded into respective nuts 61 through insertion holes in the brackets 60. Thus, it will readily be seen that the posterior rear fender subassembly 29 and the intermediate rear fender subassembly 28 are separable from each other.

With the posterior rear fender subassembly 29 and the intermediate rear fender subassembly 28 thus connected with the rear frame 33 in the manner described above, at least a rear portion of the posterior rear fender subassembly 29 protruded a distance rearwardly from rear ends 33a of the rear frame 33. Accordingly, while the posterior rear fender subassembly 29 is susceptible to damage when contacting an obstruction present in the surrounding, only the posterior rear fender subassembly 29, which is a small component part, suffices to be replaced when so damaged.

It is to be noted that although in the illustrated embodiment, of the fastening bolts 59 and 69 used to connect the rear mudguard flap 30 with the rear frame 33, only the fastening bolts 59, which forms a portion of the fastening members, have been shown and described as commonly utilized to secure the posterior rear fender subassembly 29, the use of the fastening bolts 69 for the rear mudguard flap 30 can be dispensed with. Where the fastening bolts 69 are dispensed with, all of the fastening members 59 for the rear mudguard flap 30 can be utilized commonly to connect the posterior rear fender subassembly 29 with the rear frame 33.

The intermediate rear fender subassembly 28 shown in FIG. 2 have its rear portion overlapped above the front portion of the posterior rear fender subassembly 29 and also has a front portion secured to the rear frame 33 together with the anterior rear fender subassembly 47. More specifically, the intermediate rear fender subassembly 28 is secured to the rear frame 33 together with the anterior rear fender subassembly 47 by inserting and, hence, positioning a pair of positioning pins 43 into respective positioning holes 28a in the intermediate rear fender subassembly 28, then aligning mounting holes 49a in respective left and right bosses 49, which are provided on a front inner portions of the intermediate rear fender subassembly 28, with nut holes 39a of respective nuts welded to the left and right mounting brackets 39 in the rear frame 33 from inside, finally threading fastening bolts 48 into the nut holes 39a of the nuts fast with the mounting brackets 39 after those fastening bolts 48 have been inserted through the mounting holes 49a of the left and right bosses 49 and then through mounting holes 50 in the anterior rear fender subassembly 47.

In this way, the rear fender assembly 26 including the rear fender 27 and the rear mudguard flap 30 is mounted on the motorcycle, having been fastened to the motorcycle frame structure FR.

An air cleaner 44 is fixedly mounted on the rear frame 33 by means of fitting elements (not shown). The anterior rear fender subassembly 47 is fixed also to the air cleaner 44 by means of two fastening bolts 51 threadingly engaged in respective internally threaded holes 52 defined in the air cleaner 44. The front mudguard flap 54 referred to previously is fitted to the air cleaner 44 by means of two fastening bolts 53 passing through mounting holes 57, defined in the front mudguard flap 54, and threadingly engaged into internally threaded holes 58 defined in the air cleaner 44. As can readily be understood from FIG. 1, the rear fender assembly 26 is positioned in part just above the rear wheel 14 and in part above a rear portion of the rear wheel 14. The anterior rear fender subassembly 47 is positioned in part above a front portion of the rear wheel 14 and the front mudguard flap 54 is positioned substantially forwardly of the rear wheel 14.

The rear mudguard flap 30 shown in FIG. 2 has the taillight 31 secured thereto by means of screws threadingly engaged in respective insertion holes 73 defined in such rear mudguard flap 30. This rear mudguard flap 30 also has a mounting plate 74 secured thereto by means of bolt members (not shown) that extend through respective holes 77 and are threadingly engaged in nuts 78 welded to the mounting plate 74. The license plate referred to previously and now not shown is secured to the mounting plate 74 in any known manner. The rear turn signal lights 32 shown in FIG. 1 are mounted respectively in mounting holes 79 and are thus secured to the rear mudguard flap 30.

With the rear fender assembly 26 so constructed as hereinabove described, it will readily be seen that the rear fender 27 is of two-piece construction including the intermediate rear fender subassembly and the posterior rear fender subassembly. Accordingly, in the event that the posterior rear fender subassembly 29 is damaged while the motorcycle is driven on, for example, the racing circuit, repair or replacement of the posterior rear fender subassembly 29, which is a small component part of the rear fender assembly 26, will suffice, thus facilitating the repair/replacement work economically.

Also, mold assemblies used to make the intermediate rear fender subassembly 28 and the posterior rear fender subassembly 29, respectively, can have a small size as compared with the mold assembly conventionally utilized to mold the rear half of the conventional rear fender and, accordingly, such an advantage can be appreciated that the cost of the mold assemblies can be reduced. In addition, regarding the manufacture, the intermediate rear fender subassembly 28 and the posterior rear fender subassembly 29 are colored in different colors, respectively, so that the rear fender assembly of the present invention can have an appealing appearance different from that of the conventional rear fender of one-piece construction, and as a result, the commercial value can be increased. Nevertheless, the anterior rear fender subassembly 47 may be colored in the same color as that of any one of the intermediate rear fender subassembly 38 and the posterior rear fender subassembly 29, or colored in a color different from that of any one of the intermediate rear fender subassembly 28 and the posterior rear fender subassembly 29.

Figure 4:
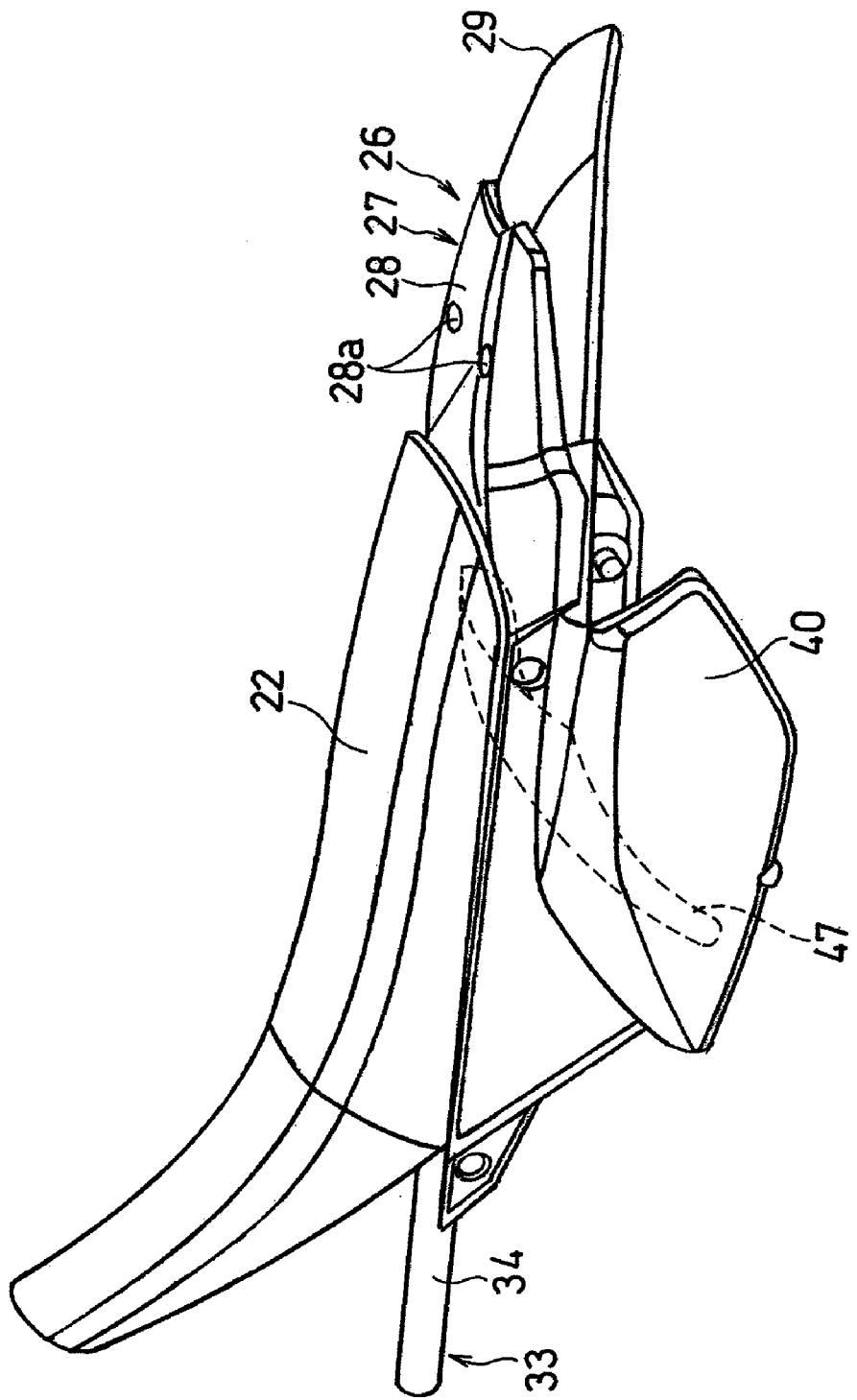
FIG. 4 is a perspective view showing the rear fender assembly in another condition assumed when the motorcycle moves on the irregular road.

The rear fender 27, when assembled in the manner shown in and described with particular reference to FIG. 2, represents full gear with the motorcycle consequently suited to running on the leveled ground surface.

Where the motorcycle is desired to be driven off road, the rear mudguard flap 30 can be removed from the rear fender assembly 26. Removal of the rear mudguard flap 30 from the rear fender assembly 26 can be accomplished by undoing the fastening bolts 48 and 59 to remove the intermediate rear fender subassembly 28 and the posterior rear fender subassembly 29 from the rear frame 33 to clear above the rear mudguard flap 30, then undoing the fastening bolts 69 to disengage the rear mudguard flap 30 from the rear frame 33 so that the rear mudguard flap 30 can be removed. Thereafter, the two fastening bolts 48 are again threaded to connect the intermediate rear fender subassembly 28 with the rear frame 33 and the two fastening bolts 59 are, after having been passed through the insertion holes 37a in the rear frame 33, subsequently threaded into the nuts 61 in the posterior rear fender subassembly 29 to thereby connect the posterior rear fender subassembly 29 with the rear frame 33 to assume such a condition as shown in FIG. 4. At this time, since the intermediate rear fender subassembly 28 and the posterior rear fender subassembly 29 serve the purpose of mudguard, the rear fender assembly 26 as a whole can have a reduced weight appropriate for the motorcycle to be driven off road. Also, since it is only the posterior rear fender subassembly 29 that is susceptible to damage during the running off road, repair or replacement of the damaged posterior rear fender subassembly 29 suffices.

Figure 5:
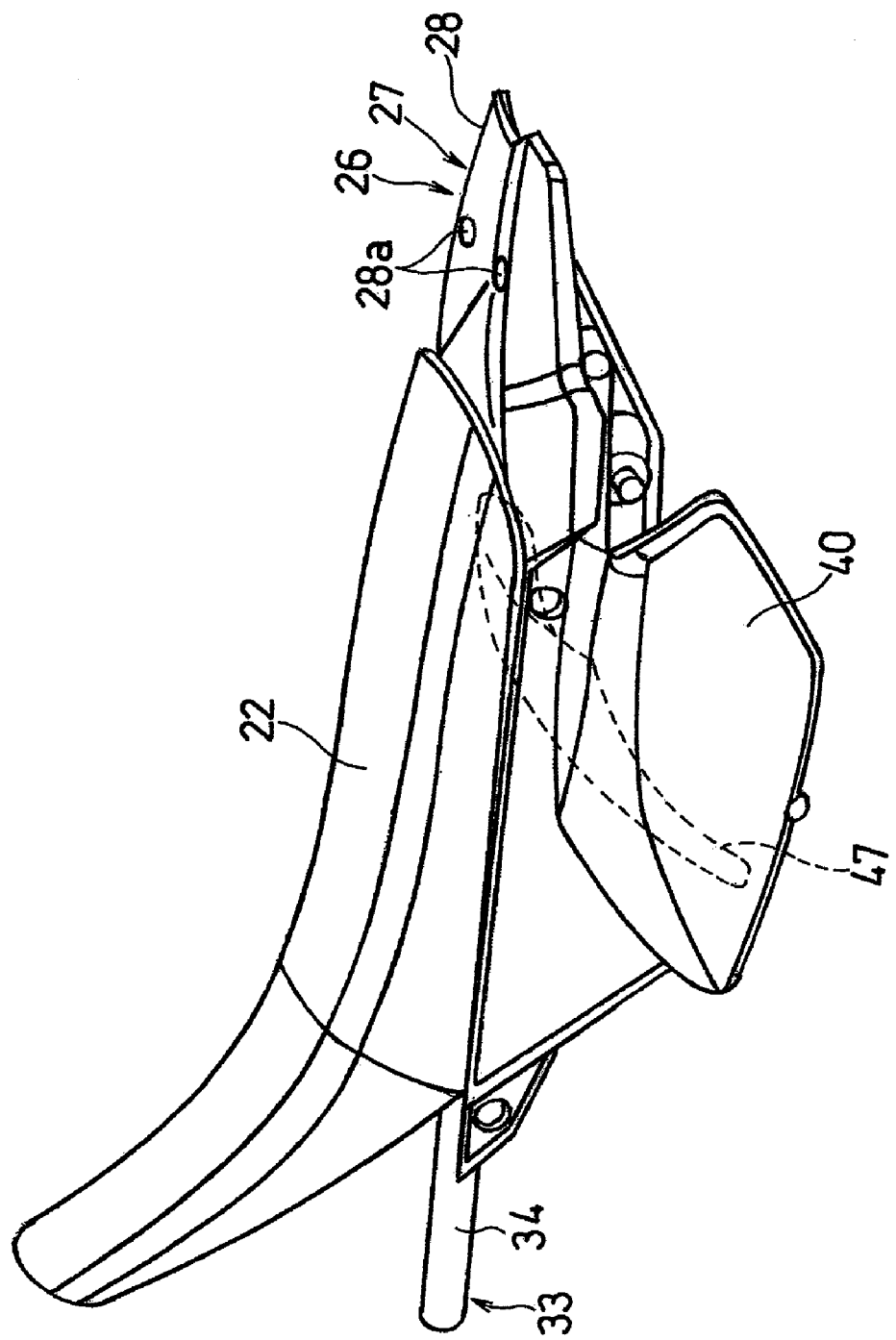
FIG. 5 is a perspective view showing the rear fender assembly in a different condition assumed when the motorcycle moves on the racing circuit.

On the other hand, where the motorcycle is desired to be driven on the racing circuit, both of the posterior rear fender subassembly 29 and the rear mudguard flap 30 are removed from the rear fender assembly 26 in a manner similar to that described above. When both of the posterior rear fender subassembly 29 and the rear mudguard flap 30 are so removed from the rear fender assembly 26, the rear fender assembly 26 assumes a condition as shown in FIG. 5. In the condition shown in FIG. 5, a minimum mudguard function required in the circuit can be secured by the intermediate rear fender subassembly 28 and, on the other hand, the rear fender assembly 26 can have a weight reduced a quantity corresponding to the sum of respective weight of the posterior rear fender subassembly 29 and the rear mudguard flap 30 which have been removed from the rear frame 33, with the rear fender assembly 26 consequently suited to running on the racing circuit.

Also, since the rear fender assembly 26 is of a structure in which the posterior rear fender subassembly 29 and the rear mudguard flap 30 are fastened to the rear frame 33 by the utilization of the fastening bolts 59, which are used as common fastening members, the number of the fastening members required can be reduced as compared with the case, in which the posterior rear fender subassembly 29 and the rear mudguard flap 30 are fastened separate fastening members.

In addition, since the rear fender 27 is of the structure, in which that rear portion of the intermediate rear fender subassembly 28 and that front portion of the posterior rear fender subassembly 29 are overlapped one above the other and that rear portion of the posterior rear fender subassembly 29 and that front portion of the rear mudguard flap 30 are similarly overlapped one above the other, the intermediate rear fender subassembly 28, the posterior rear fender subassembly 29 and the rear mudguard flap 30 altogether depict a streamlined configuration as if they are of a unitary construction and, accordingly, the rear fender assembly 26 as a whole prevents muddy water from leaking and, also, provides an appealing appearance.

Although in the foregoing embodiment, the intermediate rear fender subassembly 28, the posterior rear fender subassembly 29 and the rear mudguard flap 30 have been shown and described as removably mounted on the motorcycle frame structure FR, the intermediate rear fender subassembly 28 may be unremovable from the motorcycle frame structure FR. Accordingly, in the practice of the present invention, it is sufficient for at least the posterior rear fender subassembly 29 and the rear mudguard flap 30 to be removable relative to the motorcycle frame structure FR.

Also, the rear mudguard flap 30 may be dispensed with, in which case the motorcycle can be for use on the leveled ground surface and the irregular ground surface with the posterior rear fender subassembly 29 mounted thereon and for use on the racing circuit with the posterior rear fender subassembly 29 removed therefrom. Accordingly, only the posterior rear fender subassembly 29 may be removable relative to the motorcycle frame structure FR.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A motorcycle rear fender assembly comprising:
   a rear fender mounted on a motorcycle frame structure above a motorcycle rear wheel and including:
   fastening members;
   an anterior rear fender subassembly forming an anterior portion of the rear fender;
   an intermediate rear fender subassembly forming an intermediate portion of the rear fender; and
   a posterior rear fender subassembly forming a rear potion of the rear fender, the anterior rear fender subassembly, the intermediate rear fender subassembly and the posterior rear fender subassembly being disposed in an alignment to extend in a longitudinal axis of the motorcycle and being inter connected with the fastening members.

2. The motorcycle rear fender assembly as claimed in claim 1, further comprising a flap continued from the rear fender and covering a region rearwardly upwardly of the motorcycle rear wheel and wherein at least the posterior rear fender subassembly and the flap are removably mounted on the motorcycle.

3. The motorcycle rear fender assembly as claimed in claim 2, wherein the posterior rear fender subassembly is fastened to the motorcycle through the fastening members, at least some of those fastening members being those concurrently used to connect the flap to the motorcycle frame structure.

4. The motorcycle rear fender assembly as claimed in claim 2, further comprising a taillight and turn signal lights both mounted on the flap.

5. The motorcycle rear fender assembly as claimed in claim 1, wherein the intermediate rear fender subassembly has a rear portion overlapped with a front portion of the posterior rear fender subassembly.

6. The motorcycle rear fender assembly as claimed in claim 2, wherein the intermediate rear fender subassembly has a rear portion overlapped with a front portion of the posterior rear fender subassembly.

7. The motorcycle rear fender assembly as claimed in claim 1, wherein the anterior rear fender subassembly, the intermediate rear fender subassembly and the posterior rear fender subassembly are molded articles separate from each other.

8. The motorcycle rear fender assembly as claimed in claim 7, wherein at least two of the anterior rear fender subassembly, the intermediate rear fender subassembly and the posterior rear fender subassembly are made of resinous materials of different colors.

9. The motorcycle rear fender assembly as claimed in claim 1, wherein the intermediate rear fender subassembly and the posterior rear fender subassembly are colored in different colors, respectively.

10. The motorcycle rear fender assembly as claimed in claim 1, wherein two of the anterior rear fender subassembly, the intermediate rear fender subassembly and the posterior rear fender subassembly are colored in different colors, respectively.

11. The motorcycle rear fender assembly as claimed in claim 1, wherein the posterior rear fender subassembly is mounted on the motorcycle in a fashion separably relative to the intermediate rear fender subassembly.

12. The motorcycle rear fender assembly as claimed in claim 1, wherein at least a portion of the posterior rear fender subassembly protrudes rearwardly from the motorcycle frame structure.

* * * * *